United States Patent Office 3,541,227
Patented Nov. 17, 1970

3,541,227
TERMINAL FOR INTERCONNECTING FOIL CONDUCTOR AND WIRE CONDUCTOR
Joseph John Bendrick, Hummelstown, Pa., assignor to AMP Incorporated, Harrisburg, Pa.
Filed Nov. 13, 1968, Ser. No. 775,249
Int. Cl. H01r 9/06; H02g 15/08
U.S. Cl. 174—94                                6 Claims

ABSTRACT OF THE DISCLOSURE

The disclosure relates to a terminal for interconnecting an electrically conductive foil and an electrically conductive wire wherein the wire barrel is a stamped out portion of the terminal member, the foil conductor being placed over the barrel and being secured within the terminal by means of lances formed in the terminal member and on opposite sides thereof upon crimping. Crimping of the terminal compresses the wire barrel over the wire conductor, all within the terminal, to provide the interconnection between the electrically conductive foil and the electrical conductor wire.

---

This invention relates to a foil terminal for interconnecting an electrically conductive foil with an electrically conductive wire and, more specifically, to a crimpable terminal for interconnecting therewithin an electrically conductive foil and a standard electrical wire conductor.

The extensive use of electrically conductive foil or very thin sheet metal members (e.g., aluminum) as an electrical conductor for electronic and miniature components has been complicated in the past by the difficulty in joining the foil to other electrical conductors. Because of the fragile nature of the foil, securing of the foil to a wire or component tends to either tear the foil or make an imperfect electrical and/or mechanical connection. The prior art has attempted to overcome this problem and has made many advances therein as exemplified by patents to Weimer numbered 3,138,658 and 3,247,316. While these prior art devices have found great use, it is always desirable and necessary to improve electrical termination devices by improving the terminating quality thereof and/or decreasing the cost of manufacture thereof.

In accordance with the present invention, there is provided a terminal with laterally opposed sides for interconnecting a foil conductor and a standard wire conductor which has the above enumerated advantages. Briefly, the terminal of the present invention includes a wire barrel which is (formed in one of the opposed sides) of the terminal member, wherein the standard wire conductor is placed within the barrel and the foil conductor is placed thereover. The opposing sides of the terminal include inwardly extending lances which, upon crimping of the terminal, pierce the foil conductor and make connection thereto. The barrel is simultaneously flattened over the wire conductor, the foil conductor contacting the barrel.

It is therefore an object of this invention to provide a terminal for terminating a foil or thin sheet conductor and a wire conductor by means of a single crimp which joins both the foil conductor and the wire conductor.

It is a further object of this invention to provide a unitary terminal which has opposing flat surfaces with lances or tynes thereon for terminating foil and a wire beneath a barrel simultaneously and together between the flat surfaces of the terminal.

It is a yet further object of this invention to provide a unitary terminal capable of terminating a wire conductor and a foil conductor therein by a single crimping operation while maintaining the wire conductor and foil conductor in substantially intimate contact within the terminal.

The above objects and still further objects of this invention will immediately become apparent to those skilled in the art after consideration of the following preferred embodiment of the invention which is provided by way of example and not by way of limitation wherein.

Figure 1:
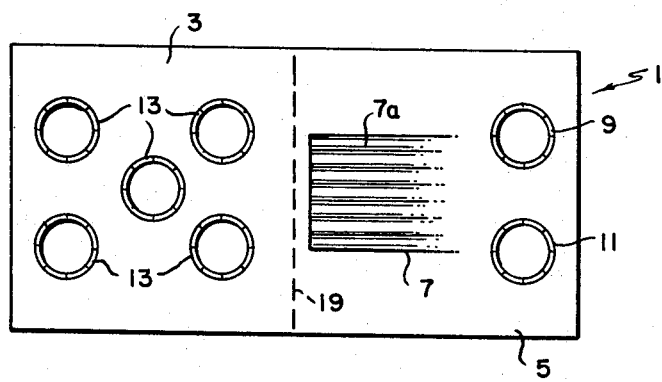
FIG. 1 is a plan view of the stamped out terminal of the present invention prior to use thereof.

Referring first to FIG. 1, there is shown in plan view the stamping of the preferred embodiment of the terminal in accordance with the present invention. The terminal 1 can be formed from an electrically conductive material such as, for example, brass. The terminal member is bent so that the two side portions thereof 3 and 5 form an acute angle with respect to each other as shown better in FIG. 2. A wire barrel 7 is formed in the portion 5 of the terminal, this wire barrel being curled inwardly as better shown in FIG. 2 for receiving of a wire conductor therewithin. The portion 5 also includes inwardly extending lances 9 and 11 whereas the portion 3 includes a plurality of inwardly extending lances 13. Wire barrel 7 is preferably provided with serrations 7a which enhance the electrical and mechanical connection with wire 21, the mechanical aspect providing excellent tensile characteristics and the electrical aspect breaking down oxide coatings.

Figure 2:
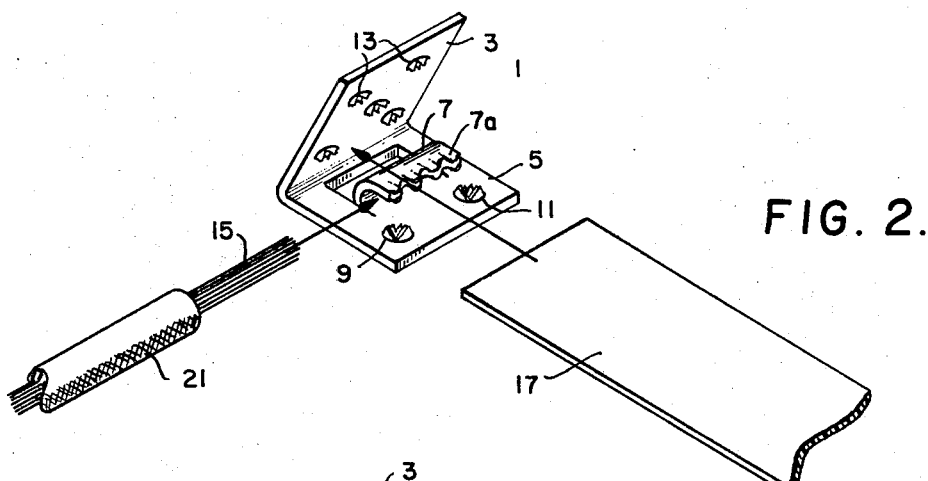
FIG. 2 is a perspective view of the terminal in accordance with the present invention during loading thereof with a wire conductor and a foil conductor.

Referring now to FIG. 2, there is shown the terminal member 1 prepared for use in forming a termination of a standard wire and a flat foil conductor. The side portions 3 and 5 form an acute angle with each other and the wire barrel 7 is curled over for receiving a wire conductor 15 therewithin between the flat portion 5 and the wire barrel 7 as shown by the arrow in FIG. 2. The foil conductor 17 is then placed over and in contact with the wire barrel 7 and, preferable, extends inwardly to reach the bend 19 of the terminal. At this point, the conductor portion 15 of the wire 21 will be positioned beneath the wire barrel 7 and the foil conductor 17 will be positioned over the wire barrel 7 and will extend to the rear bend 19. The terminal is now ready for crimping.

Figure 3:
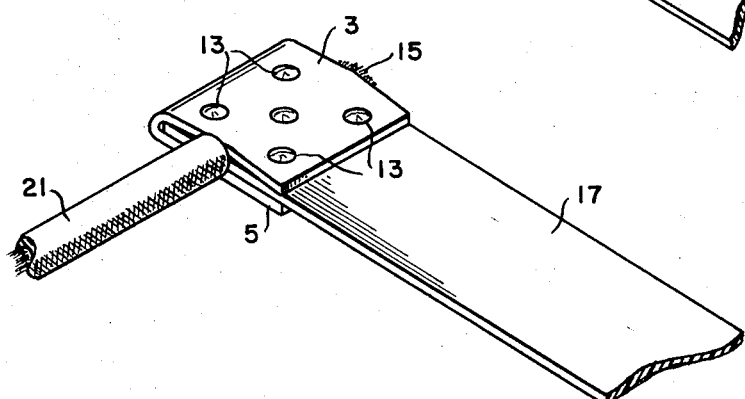
FIG. 3 is a perspective view of the terminal of the present invention after it has been crimped with a wire conductor and a foil conductor terminated therein.

The terminal with the wire conductor and foil conductor positioned therein, as explained hereinabove, is then placed in a crimping tool and a single crimping action then takes place bringing the side portions 3 and 5 together. This crimping action will cause the wire barrel 7 to be forced downwardly and be flattened against the wire conductor 15 and secure the wire conductor within the terminal 1. Simultaneously, the portions 3 and 5 of the terminal are forced together, thereby causing the inwardly extending lance members 9, 11 and 13 to pierce the foil conductor 17 and form good electrical and mechanical contact thereto. This crimping action provides a good mechanical bond with both the wire conductor and the foil conductor and provides a mechanically secure termination as well as providing good electrical conducting properties between the wire conductor and the foil conductor. The final termination is shown in FIG. 3.

It can be seen that the terminal member of the present invention is easy to use and apply to wire and foil conductors which are to be interconnected and is economically more practical than prior art terminating members for the same problem.

Though the invention has been described with respect to a specific preferred embodiment thereof, many variations and modifications thereof will immediately become apparent to those skilled in the art. It is therefore the in-

What is claimed is:

1. An electrical connector for interconnecting a wire conductor and a thin sheet conductor which comprises a pair of opposed surfaces folded about a center line, each of said surfaces including a plurality of inwardly extending lance members formed therein, one of said surfaces further including wire barrel for receiving said wire conductor, said thin sheet conductor being received between said barrel and the other of said surfaces.

2. An electrical connector as set forth in claim 1 wherein said barrel is formed from a portion of said one of said surfaces, said barrel being of substantially C-shaped.

3. An electrical connection which comprises a pair of opposed surfaces folded about a center line, each of said surfaces including a plurality of inwardly extending lances, one of said surfaces including an inwardly disposed barrel, a wire conductor positioned between said barrel and said one of said surfaces and a thin sheet conductor positioned between said barrel and the other of said surfaces, the said surfaces being crimped together.

4. An electrical connection as set forth in claim 3 wherein said barrel and said lances are formed from portions of said surfaces.

5. An electrical connection as set forth in claim 3 wherein said surfaces are crimped together and wherein at least some of said lances extend into said foil.

6. An electrical connection as set forth in claim 5 wherein said barrel is flattened against said wire conductor.

References Cited

UNITED STATES PATENTS 3,138,658   6/1964   Weimer.
3,247,316   4/1966   Weimer.

DARREL L. CLAY, Primary Examiner

U.S. Cl. X.R.

29—628; 174—84; 339—95, 276